(12) United States Patent
Adams et al.

(10) Patent No.: US 7,604,594 B2
(45) Date of Patent: Oct. 20, 2009

(54) METHOD AND SYSTEM OF CONTROLLING ULTRASOUND SYSTEMS

(75) Inventors: Qian Zhang Adams, New Berlin, WI (US); Richard Marion Kulakowski, Richfield, WI (US); Michael Joseph Washburn, Brookfield, WI (US)

(73) Assignee: General Electric Company, Schenectady, NY (US)

( * ) Notice: Subject to any disclaimer, the term of this patent is extended or adjusted under 35 U.S.C. 154(b) by 808 days.

(21) Appl. No.: 10/911,014

(22) Filed: Aug. 4, 2004

(65) Prior Publication Data

US 2006/0030775 A1 Feb. 9, 2006

(51) Int. Cl.
*A61B 8/00* (2006.01)
*G06K 9/34* (2006.01)

(52) U.S. Cl. .................. 600/437; 600/443; 382/173

(58) Field of Classification Search ......... 600/437–443; 73/631; 181/101–125; 382/173; 367/87, 367/7–11, 118–129, 14
See application file for complete search history.

(56) References Cited

U.S. PATENT DOCUMENTS

| | | | | |
|---|---|---|---|---|
| 3,617,631 A * | 11/1971 | Soames | ...................... | 382/190 |
| 4,016,750 A * | 4/1977 | Green | ......................... | 73/629 |
| 4,327,738 A * | 5/1982 | Green et al. | ................ | 600/109 |
| 4,387,597 A * | 6/1983 | Brandestini | .................. | 73/626 |
| 4,463,608 A * | 8/1984 | Takeuchi et al. | .............. | 73/606 |
| 4,584,880 A * | 4/1986 | Matzuk | ...................... | 73/609 |
| RE33,259 E * | 7/1990 | Crooks et al. | ............... | 324/309 |
| 5,045,935 A * | 9/1991 | Kikuchi | ....................... | 348/71 |
| 5,324,923 A * | 6/1994 | Cymbalski et al. | .......... | 235/454 |
| 5,524,626 A * | 6/1996 | Liu | ............................ | 600/442 |
| 5,579,768 A | 12/1996 | Klesenski | | |
| 5,594,807 A * | 1/1997 | Liu | ............................ | 382/128 |
| 5,910,816 A * | 6/1999 | Fontenot et al. | ............... | 348/65 |
| 6,059,729 A * | 5/2000 | Stonger | ...................... | 600/443 |
| 6,120,446 A * | 9/2000 | Ji et al. | ....................... | 600/437 |
| 6,263,094 B1 * | 7/2001 | Rosich et al. | ............... | 382/128 |
| 6,315,725 B1 * | 11/2001 | Masters | ...................... | 600/443 |
| 6,468,218 B1 * | 10/2002 | Chen et al. | .................. | 600/443 |
| 6,743,174 B2 * | 6/2004 | Ng et al. | ..................... | 600/437 |
| 7,114,375 B2 * | 10/2006 | Panetta et al. | .............. | 73/61.75 |
| 2004/0087856 A1 * | 5/2004 | Panda et al. | ................. | 600/443 |
| 2004/0101206 A1 * | 5/2004 | Morimoto et al. | ........... | 382/254 |
| 2006/0030775 A1 * | 2/2006 | Adams et al. | ............... | 600/437 |

\* cited by examiner

*Primary Examiner*—Eric F Winakur
*Assistant Examiner*—Michael T Rozanski
(74) *Attorney, Agent, or Firm*—The Small Patent Law Group; Dean D. Small

(57) ABSTRACT

A method and system for controlling an ultrasound system are provided. The method includes processing image data received from an ultrasound system to obtain a time gain compensation correction curve, wherein the image data is internally time gain compensated. The method further includes processing the image data using the time gain compensation correction curve and user inputs parameters. The user input parameters include at least one of a user defined time gain compensation parameter and a user defined dynamic range parameter.

23 Claims, 10 Drawing Sheets

US 7,604,594 B2

METHOD AND SYSTEM OF CONTROLLING ULTRASOUND SYSTEMS

BACKGROUND OF THE INVENTION

This invention relates generally to ultrasound systems, and more particularly, to control of ultrasound systems using Time Gain Compensation (TGC).

As an ultrasound wave travels through different layers of tissues, the amplitude of the wave decreases due to attenuation. Such energy loss is proportional to the tissue attenuation coefficient and the frequency of the ultrasound wave. Further, such energy loss also is proportional to the distance traveled by the ultrasound wave. Thus, echoes received from a tissue deeper in the body have less energy than those received from a similar tissue relatively closer to the surface of the body. For example, in Brightness mode (B-mode) grayscale imaging technique, the amplitude of a received echo is used to form an image. The brightness of a pixel in a B-mode image represents the strength of the corresponding echo. It is often desirable to display similar tissues with similar brightness, regardless of location relative to the transducer. TGC is often used in B-mode image processing to compensate for tissue attenuation in the body and equalize the tissue brightness across the entire image.

Several factors affect brightness for similar tissues, regardless of the position of the tissue relative to the transducer. Because the tissue attenuation coefficient varies among anatomies and body types (especially body with pathology) and the acoustic path an ultrasound wave travels within a body is often unpredictable, it is difficult to predict the exact attenuation an ultrasound wave experiences when traveling through the body. To compensate for energy loss due to attenuation, known ultrasound systems usually employ a combination of an internal TGC curve and external TGC sliding pots. The internal TGC curve is defined by predetermined values and is typically fixed for a given ultrasound system setting. These predetermined values may be calculated, for example, using statistical analysis on the acquired image data or empirically from an average body type. If, during a clinical scan, a patient has a body type that is very different from an average body type, the internal TGC does not properly compensate for the tissue attenuation. As a result, uneven brightness or banding artifacts may result in the displayed image. Therefore, manual adjustment of the external TGC sliding pots is performed to correct and/or minimize the banding. However, such adjustment is usually imprecise and time consuming. For example, because this adjustment requires human intervention, errors are more likely.

The banding artifacts are further visible when multiple focal zones are used to form an image. A focal zone is a location within the body at which the transmitted ultrasound wave is focused. Each focal zone has a corresponding focal region over which the energy transmitted to that focal zone produces the best image. Typically, different waveforms and frequencies of the ultrasound waves are used for different focal zones. The ultrasound image is obtained by combining multiple focal regions, wherein each focal region corresponds to a focal zone. Each focal zone may use different ultrasound waves, which tend to attenuate differently in the body. Thus, when two or more focal regions are joined together, the borders of the regions may be distinct and visible in the image as banding artifacts.

BRIEF DESCRIPTION OF THE INVENTION

In an exemplary embodiment, a method for controlling an ultrasound system is provided. The method includes processing image data received from an ultrasound system to obtain a time gain compensation correction curve, wherein the image data is internally time gain compensated. The method further includes processing the image data using the time gain compensation correction curve and user input parameters. The user input parameters include at least one of a user defined time gain compensation parameter and a user defined dynamic range parameter.

In another exemplary embodiment, an ultrasound system is provided. The ultrasound system includes a probe for performing a scan to acquire image data and an internal TGC unit for processing the image data to obtain internally time gain compensated image data. The ultrasound system further includes a processor configured to first process the internally time gain compensated image data The processor further configured to apply the time gain compensation correction curve to the received image data. The processor also configured to perform time gain compensation on the processed image data using user input parameters. The user input parameters including at least one of a user defined time gain compensation parameter and a user defined dynamic range parameter.

DETAILED DESCRIPTION OF THE INVENTION

Various embodiments of an ultrasound system and a control method thereof are provided to automatically process internally time gain compensated image data to generate a TGC correction curve. Further, application of a user requested TGC curve is provided. Suppression of noise in the far-field and TGC curve correction during cine loop playback are also provided.

Figure 1:
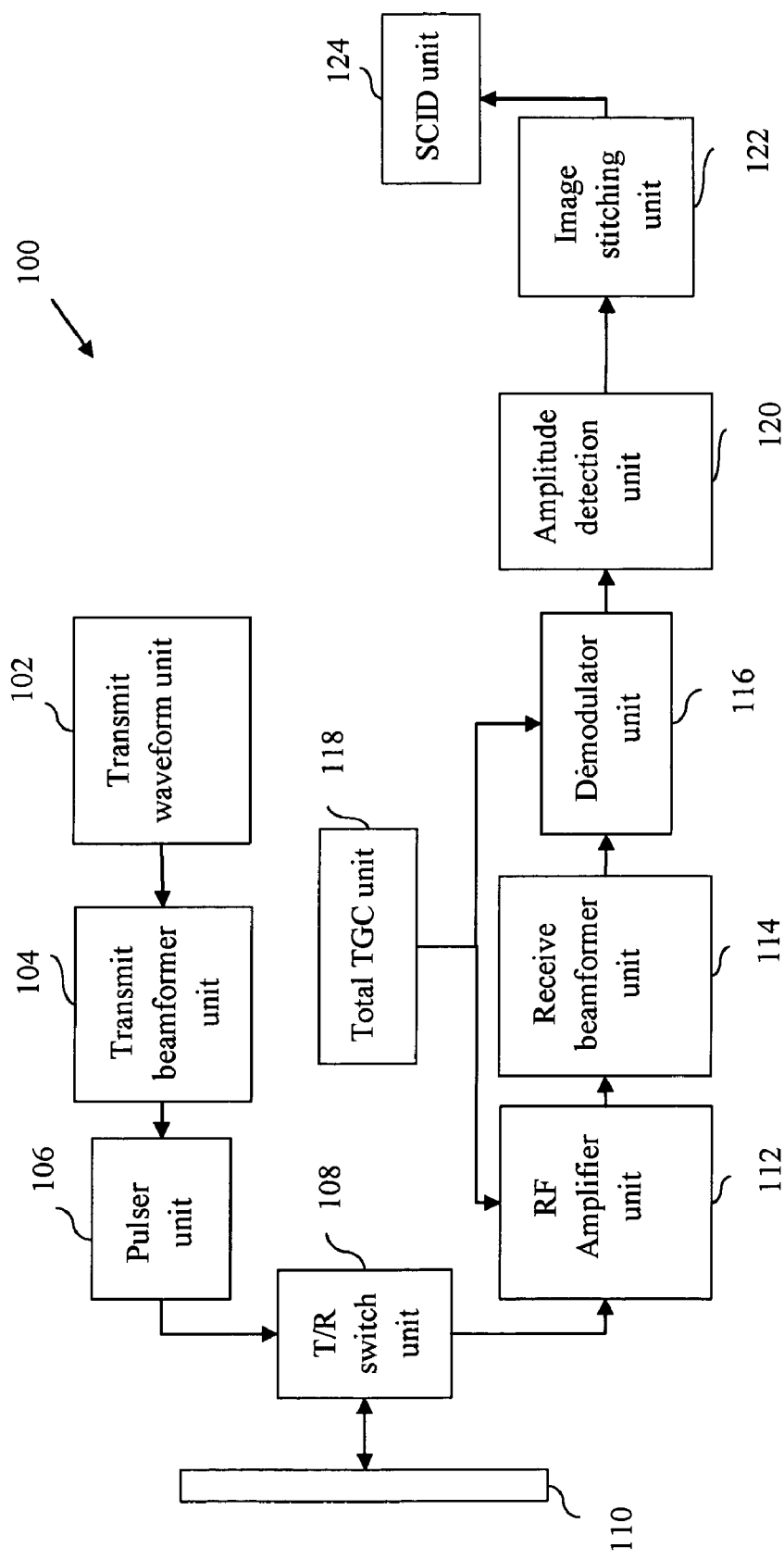
FIG. 1 is a block diagram illustrating an ultrasound system configured to use a typical Time Gain Compensation (TGC) curve.

FIG. 1 is a block diagram illustrating an ultrasound system 100 configured to use a typical TGC curve. Ultrasound system 100 includes a transmit waveform unit 102, a transmit beamformer unit 104, a pulser unit 106, a Transmit/Receive switch (hereinafter referred to as a TR switch) unit 108, a transducer array 110, an RF amplifier unit 112, a receive beamformer unit 114, a demodulator unit 116, a total TGC unit 118, an amplitude detection unit 120, an image-stitching unit 122 and a Scan Conversion and Image Display (SCID) unit 124.

In various embodiments transducer array 110 comprises a plurality of separately driven transducer elements, each of which produces a burst of ultrasonic waves when excited by a single pulser in pulser unit 106. To transmit a directed and focused ultrasound beam, the waveforms applied to each element in the transducer include appropriate time delays. This is provided by transmit beamformer unit 104, in which the electronic waveforms generated by transmit waveform unit 102 are subjected to appropriate time delay based on ultrasound beam location, focal position for the ultrasound scan and the location of the transducer element within transducer array 110.

Each pulser in pulser unit 106 is coupled to a respective transducer element through a transmit/receive (TR) switch in TR switch unit 108. In various embodiments, the TR switches are diodes that protect the receiver electronics, such as RF amplifier unit 112, from high voltages generated by the transmitter electronics, such as pulser unit 106. The echo signals reflected from the objects located at successive ranges along the ultrasound beam are sensed separately by each element in transducer array 110 and converted to electrical signals. These electrical signals are provided separately to RF amplifier 112 through TR switch unit 108. A sample of the echo signal magnitude at a particular point in time represents the amount of reflection occurring at a specific range. Due to the differences in the propagation path between a reflecting point and each transducer element, these echo signals are not detected simultaneously and their amplitudes are not equal. In various embodiments, RF amplifier unit 112 amplifies the separate echo signals. Receive beamformer unit 114 applies appropriate time delay to each echo signal. Thereafter, receive beamformer unit 114 sums the delayed echo signals to provide an RF echo signal that indicates the total ultrasonic energy reflected from a specific point located at a particular range along the ultrasonic beam. In various embodiments, the time delays used by receive beamformer 114 are computed in real-time using dedicated hardware or determined from a look-up table. The RF echo signal is then provided to demodulator unit 116 to convert it to a base band signal.

Total TGC unit 118 performs time gain compensation at RF amplifier unit 112 and at demodulator unit 116. The time gain compensation performed includes both an internal TGC curve (e.g., predetermined settings and/or parameters) and an external TGC curve (e.g., user defined settings and/or parameters). Further, amplitude detection unit 120 converts the time gain compensated base band signal into an image signal. The image signal corresponding to various focal regions is stitched together or combined to form a complete image by image-stitching unit 122. The complete image is processed by SCID unit 124 to display the final scanned image on a display (not shown).

Figure 2:
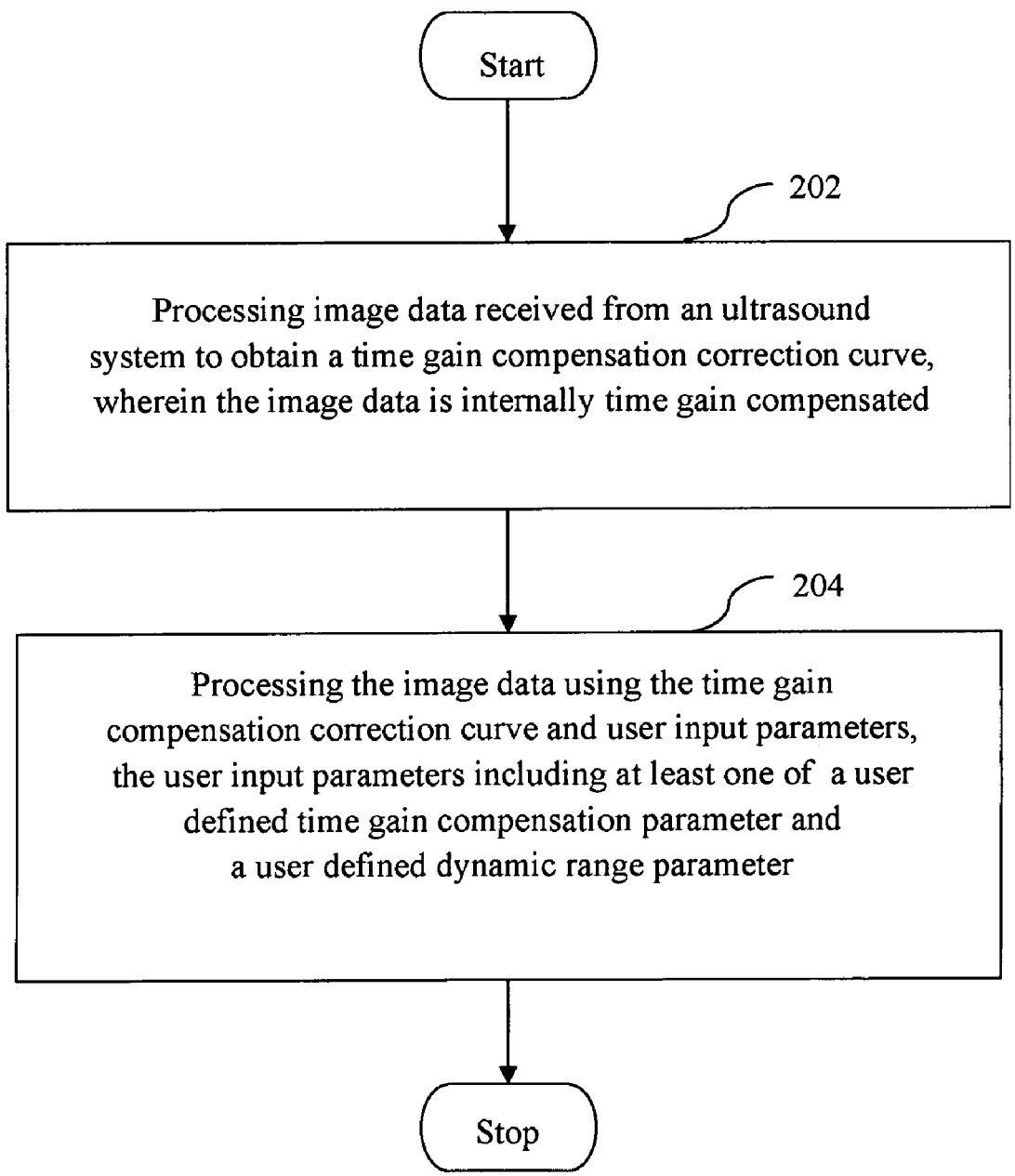
FIG. 2 is a flowchart illustrating a method of controlling an ultrasound system in accordance with an exemplary embodiment of the invention.

FIG. 2 is a flowchart illustrating a method of controlling an ultrasound system in accordance with an exemplary embodiment of the invention. At 202, image data received from an ultrasound system is processed to obtain a time gain compensation correction curve. The image data is also internally time gain compensated. In various embodiments, the internal TGC curve used for this data is calculated in real-time. In an exemplary embodiment, the internal TGC curve is obtained from a look-up table based on a given ultrasound system setting, for example application, frequency and focal zone location. In various embodiments, the internally time gain compensated image data is processed to perform amplitude detection. Further, the amplitude detected image data is combined (e.g., stitched together) before the processing to obtain the time gain compensation correction curve.

At 204, the image data is processed using the time gain compensation correction curve and user input parameters. In various embodiments, the user input parameters include at least one of a user defined time gain compensation parameter and a user defined dynamic range parameter.

The user defined time gain compensation parameter represents the external time gain compensation to be applied to the image data. In various embodiments, the user defined time gain compensation parameter is computed based on a gain knob value and TGC sliding pots positions of the ultrasound system. The gain knob value adjusts the overall brightness of the image, while the TGC sliding pots positions affect the brightness of a portion of image vertically. The use of TGC sliding pots gives a user further control to compensate for signal attenuation due to distance to achieve, on average, uniform brightness throughout the image.

In various embodiments, the image data is log compressed for display on a screen, such as an SCID. In an exemplary embodiment, the log compression is performed on the image data before processing it using the time gain compensation correction curve. In another exemplary embodiment, the log compression is performed on the image data after processing it using the user input parameters.

In various embodiments, the user defined dynamic range parameter is the ratio of the largest to the smallest amplitude and/or power of the detected echoes that are desired to be displayed in the ultrasound scan image. Therefore, this parameter is used to identify the range of image data to be displayed by the ultrasound system.

In various embodiments, the image data is stored before processing the image data using the user defined time gain compensation parameter(s). Further, the user defined time gain compensation parameter(s) are also stored. Thus, the scan can be viewed in the future after processing the image data using the stored user defined time gain compensation parameter(s). Further, in various embodiments, the stored image data is processed using a new user defined time gain compensation parameter. Thereby, any human errors in setting the user defined time gain compensation parameter at the time of the scan can be corrected in the future.

Figure 3:
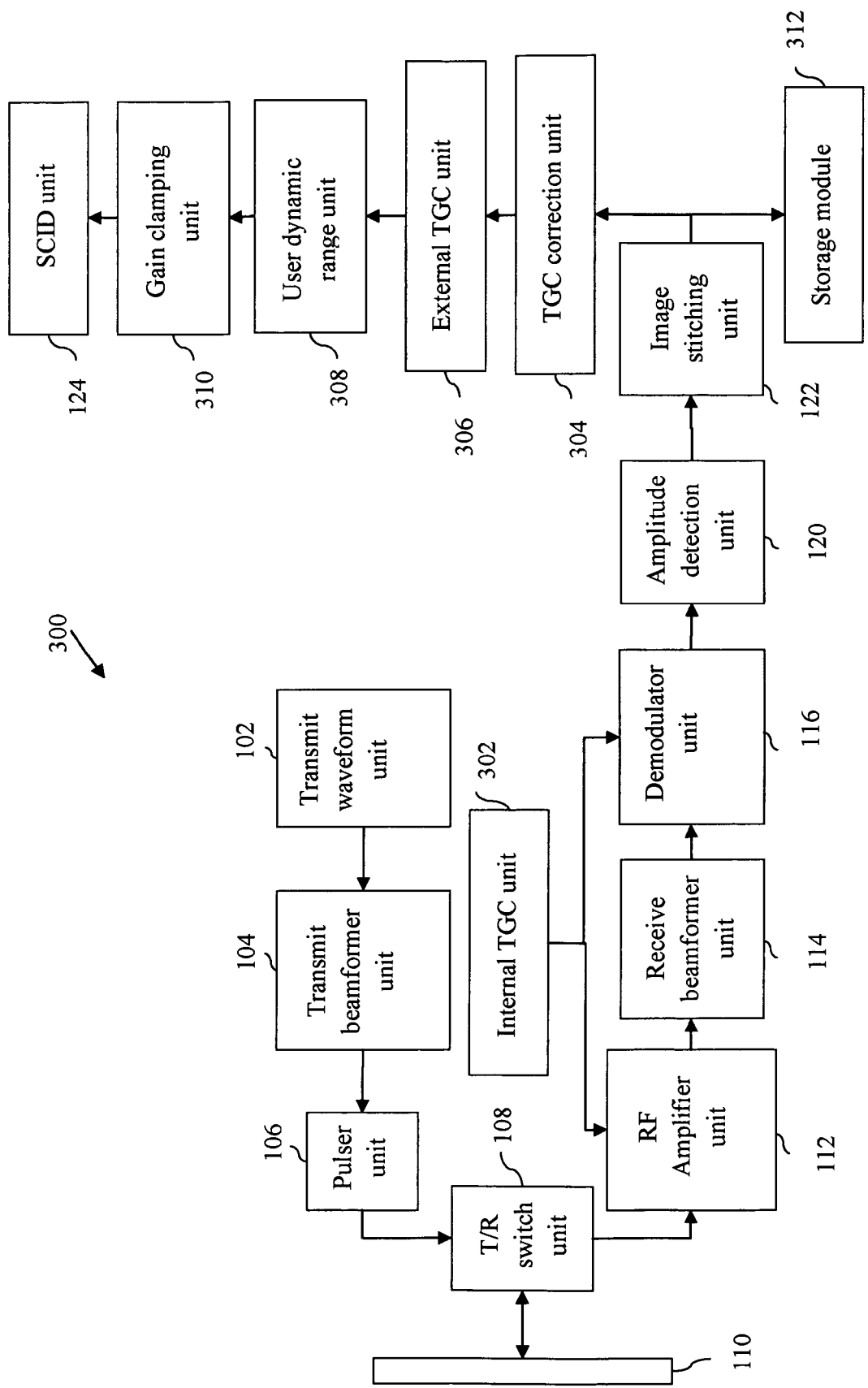
FIG. 3 is a block diagram illustrating an ultrasound system implementing TGC in accordance with an exemplary embodiment of the invention.

FIG. 3 is a block diagram illustrating an ultrasound system 300 implementing TGC in accordance with an exemplary embodiment of the invention. Ultrasound system 300 includes transmit waveform unit 102, transmit beamformer unit 104, pulser unit 106, TR switch unit 108, transducer array 110, RF amplifier unit 112, receive beamformer unit 114, demodulator unit 116, amplitude detection unit 120, image-stitching unit 122, Scan Conversion and Image Display (SCID) unit 124, an internal TGC unit 302, a TGC correction unit 304, an external TGC unit 306, a user dynamic range unit 308 and a gain-clamping unit 310.

Internal TGC unit 302 performs internal time gain compensation at RF amplifier unit 112 and at demodulator unit 116. Further, TGC correction unit 304 processes the complete image obtained from image-stitching unit 122 to generate the time gain compensation correction curve. In an exemplary embodiment, the activation of TGC correction unit 304 is controlled by user input. Examples of such user input include, but are not limited to, the pushing of a designated button. In another exemplary embodiment, the activation of TGC correction unit 304 is controlled by a system controller. Upon activation, TGC correction unit 304 processes image data output from image-stitching unit 122 to generate the time gain compensation correction curve (hereinafter referred to as TGC_correction). The time gain compensation correction curve is generated such that if it is used to process the image data output from image stitching unit 122, uniform tissue brightness in the entire image results.

Thereafter, external TGC unit 306 processes the image data output of TGC correction unit 304 using the external time gain compensation curve (hereinafter user_requested_TGC). The processing performed by TGC correction unit 304 and external TGC unit 306 is described in further detail with reference to FIG. 7. The image data output of external TGC unit 306 is provided to user dynamic range unit 308, which identifies the range of image data to be displayed by the ultrasound system in accordance with the user defined dynamic range parameter. Further, gain-clamping unit 310 performs gain clamping to provide suppression of noise in the far field and smooth fading in the complete image. The processing performed by gain clamping unit 310 is described further with reference to FIG. 6. After processing by gain-clamping unit 310, the image is provided to SCID unit 124 to display the final scanned image.

In various embodiments of the invention, the complete image obtained from image-stitching unit 122 may be stored in a storage unit 312 without any further processing (e.g., without application of the external TGC curve, or the time gain compensation curve). Storage unit 312 also stores the user input parameters associated with the stored scan data. The stored complete image and user input parameters may be later processed. In an exemplary embodiment of the invention, the stored complete image may be processed using a new set of user input parameters that were not defined at the time of the scan.

In operation, user_requested_TGC is applied after the data is processed by TGC correction unit 304. As banding artifacts may be caused by improper positioning of TGC sliding pots, the separation of the internal TGC and user requested TGC reduces such bandings, because the external TGC is known and can be corrected in TGC correction unit 304 as described above.

In various embodiments, TGC correction unit 304 may consist of two stages of image processing as described with reference to FIG. 8.

Figure 4:
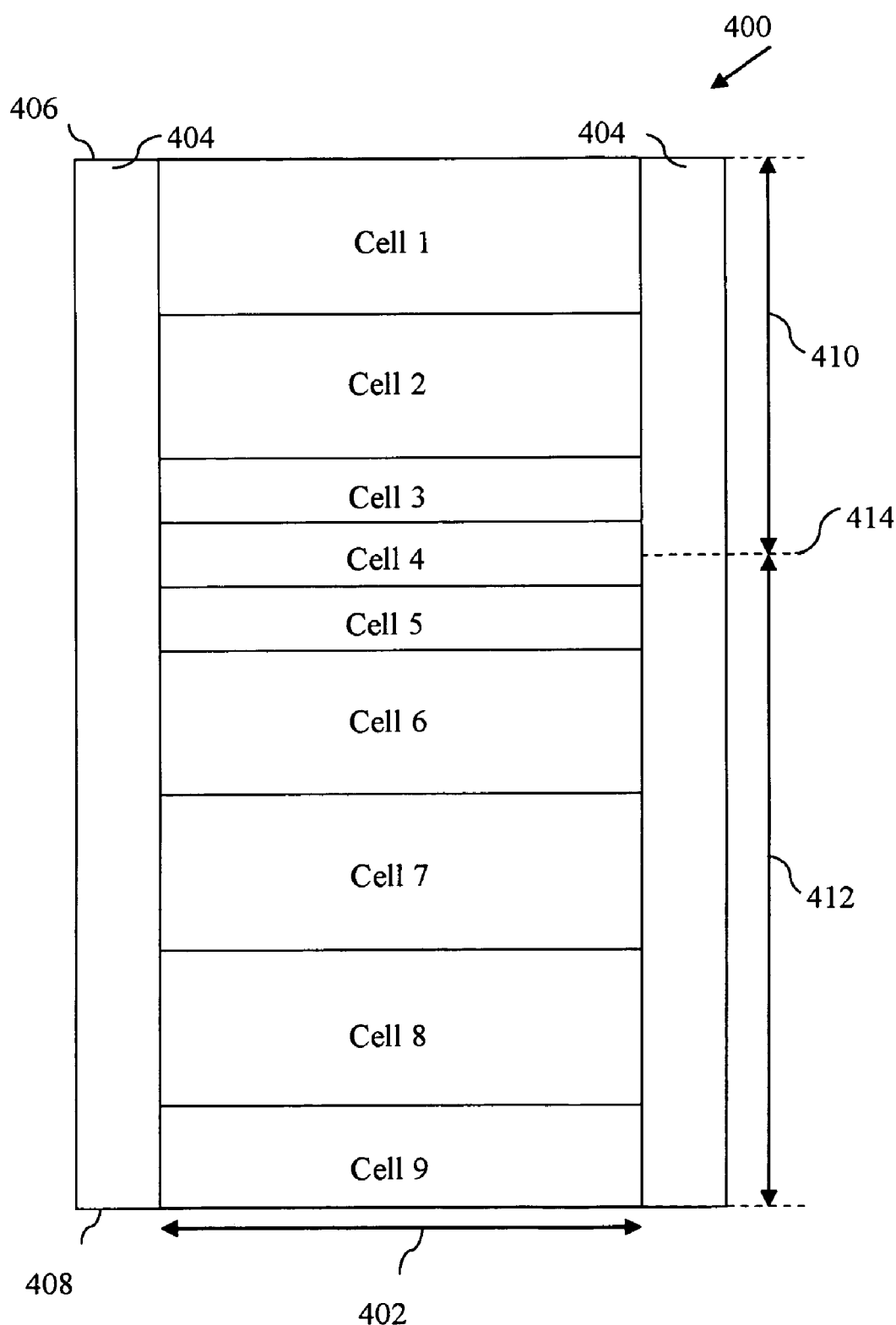
FIG. 4 is a block diagram illustrating an exemplary division of an ultrasound image into cells in accordance with an exemplary embodiment of the invention.

FIG. 4 shows a block diagram illustrating an exemplary division of an ultrasound image 400 into at least one cell in accordance with an exemplary embodiment of the invention. In operation, TGC correction unit 304 divides a frame of image data into a center portion 402 and two edge portions 404 having an image top 406 and an image bottom 408. The frame of image data is stitched together or combined from two focal regions corresponding to a first focal zone 410 and a second focal zone 412. Focal zones 410 and 412 are joined together at a splice position 414. Further, center portion 402 is divided into nine cells, Cell 1 to Cell 9. In an exemplary embodiment, each cell has the same width or the same number of pixels along lateral direction. However, different cells having different heights or different number of pixels along axial direction may be provided. For example, the height of a cell may be based on the distance between the cell center and the nearest splice position. Cells close to a splice position, such as cell 3, cell 4 and cell 5, have less height than cells away from a splice position, such as cell 2, cell 7 and cell 8. This height of a cell may be determined based on the internal TGC curve. In one embodiment, the height of each cell is selected such that the internal TGC curve is nearly constant within the cell.

For illustrating a method of calculating the TGC correction curve as described below, only center portion 402 is used. However, it should be noted that the method is also applicable for edge portions 404 and for TGC correction laterally in the image.

Figure 5:
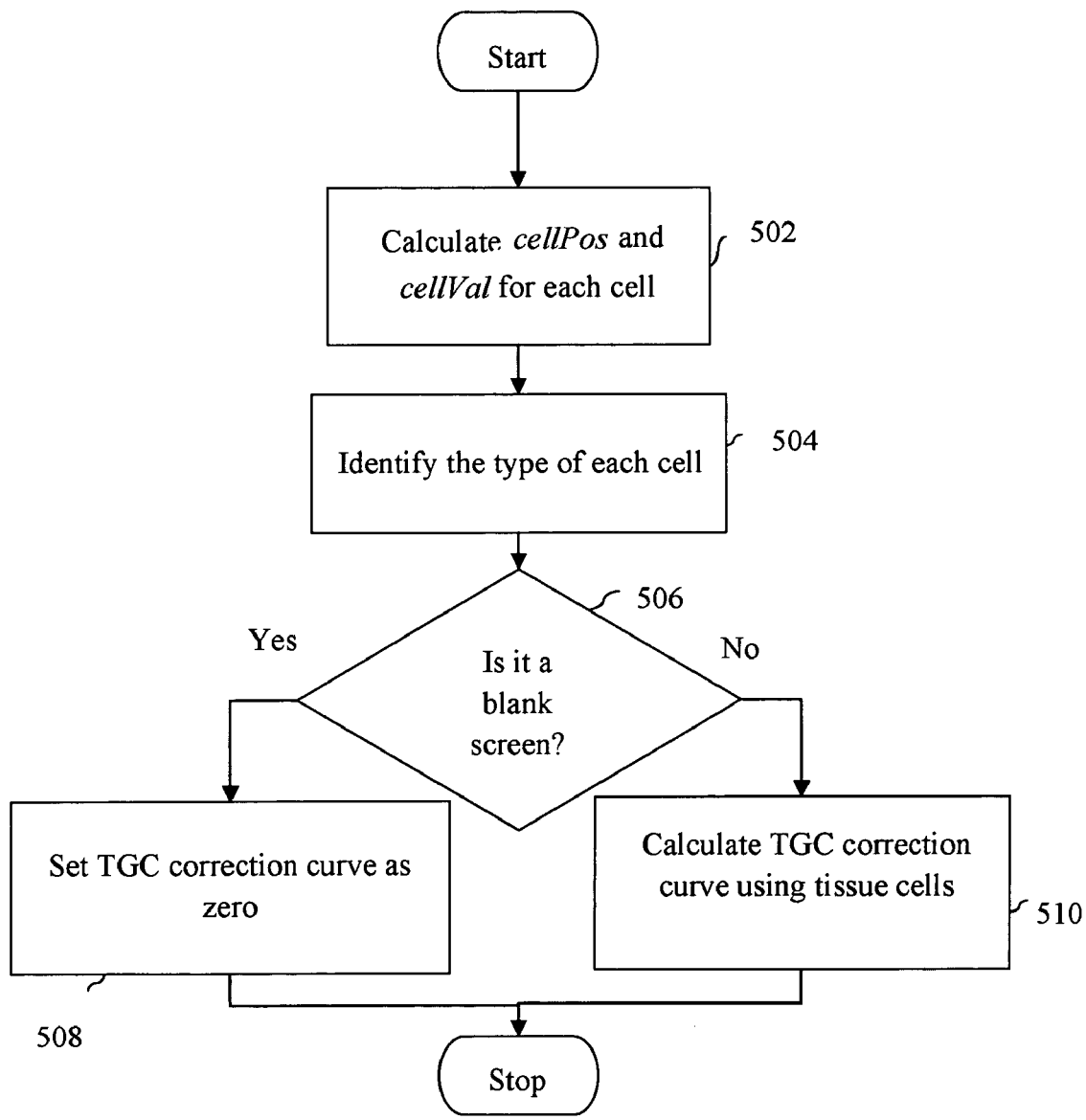
FIG. 5 is a flowchart illustrating a method of calculating a TGC correction curve for a frame of image data in accordance with an exemplary embodiment of the invention.

FIG. 5 is a flowchart illustrating a method of calculating the TGC correction curve for a frame of image data in accordance with an exemplary embodiment of the invention. Specifically, at 502, cellPos and cellVal values are calculated for each cell in the frame of image data. In an exemplary embodiment, cellPos is the center location of the cell and calculated as:

$$\text{cellPos}=((\text{Left}+\text{Right})/2, (\text{Top}+\text{Bottom})/2) \quad (1)$$

where Left, Right, Top and Bottom denote the position of the leftmost, rightmost, topmost and bottommost pixel in the cell, respectively.

cellVal defines the perceived tissue intensity value of the cell. Thus, if a cell consists of a dark region, a tissue region and a bright region, only the tissue region data in the cell is used for calculating cellVal. In various embodiments of the invention, cellVal is calculated as follows:

First, the mean value of the image data is calculated as:

$$\text{imgMean}=\text{mean}(\text{ImageData}) \quad (2)$$

where ImageData represents the intensity values of the pixels in the image being processed. The intensity value of the pixel is defined as the square of the product of internal TGC value for the pixel and the amplitude of the acoustic echo for the same pixel.

Second, a standard deviation is calculated for ImageData as:

$$\text{imgStd}=\text{std}(\text{ImageData}) \quad (3)$$

where std( ) denotes the standard deviation function.

Thereafter, the upper and lower limits of tissue pixel intensity are defined as:

$$\text{tissUpp}=\min(\text{imgMean}+\text{kupp}*\text{imgStd}, \text{Xupp}) \quad (4)$$

$$\text{tissLow}=\max(\text{imgMean}+\text{klow}*\text{imgStd}, \text{Xlow}) \quad (5)$$

where kupp, klow, Xupp and Xlow are empirically derived constants. The constants are obtained by analyzing the relationship between the histogram of ImageData and graphic representation of the ImageData observed in the scan. These constants are usually varied by scan applications (e.g. abdomen scan, carotid scan, etc.).

Finally, cellVal is calculated as the median of all pixel intensity values between tissUpp and tissLow. Specifically:

$$\text{cellVal}=\text{median}(\text{tissLow}<\text{cellData}<\text{tissUpp}) \quad (6)$$

Various other definitions of cellVal may be used as desired or needed. For example, the cellVal can be calculated as the mean of the all pixel intensity values between tissUpp and tissLow.

At 504, the type of each cell in the frame is determined. Specifically, at 504, for each cell, a determination is made as to whether the cell is a tissue cell or a non-tissue (dark region or the bright region) cell. In various embodiments of the invention, this determination is performed using the following:

$$tissPixelCounts > k*non\_tissPixelCounts \qquad (7)$$

where tissPixelCounts is the number of pixels in the cell with intensity values lying between tissLow and tissUpp, non_tissPixelCounts is the number of pixels in the cell with intensity values less than tissLow or greater than tissUpp, and k is an empirical constant. In various embodiments, k is obtained heuristically by analyzing the relationship between graphic representation of the cell data and cell statistics. In various embodiments, k is equal to or greater than 1.

If Equation 7 is true for a cell, it is identified as a tissue cell. If Equation 7 is not true for a cell, it is identified as a non-tissue cell. The process is repeated for each cell in the frame.

Thereafter, at 506, a determination is made as to whether the frame of image data represents a blank screen. In an exemplary embodiment, this is accomplished by using two criteria. The first criterion is that imgMean must be less then a threshold value for a frame to be a blank screen. The second criterion is that all cells except cells at the very top and bottom of the image (e.g. Cell 1 and Cell 9 shown in FIG. 4) need to be non-tissue cells using the method described with reference to Equation 7. If the frame is determined to be a blank screen at 506, then at 508, the TGC correction curve for the frame is set to zero, and the method terminates.

However, if at 506, the cell is identified to be non-blank, then at 510, the TGC correction curve is calculated for the frame, using the tissue cells identified at 508. In various embodiments of the invention, the TGC curve is calculated using the equation:

$$TGC\_cellCmp = imgNormCurve - cellVal \qquad (8)$$

where TGC_cellCmp is the TGC correction curve in dB, and imgNormCurve is a brightness curve in dB that yields ideal image brightness across the frame. CellVal as defined in Equation 6 also maybe converted to dB units.

The TGC correction curve TGC_cellCmp is then interpolated or extrapolated to yield a TGC_pixelCmp curve that compensates image data along axial direction. In various embodiments of the invention, TGC_pixelCmp is averaged over the TGC correction curves for previous frames to reduce the correction variation between frames.

TGC_pixelCmp is used to process original image data to obtain processed image data at the output of TGC correction unit 304 with the following equation:

$$newImgVal(i,:) = orgImgVal(i,:) + TGC\_pixelCmp(i) - user\_requested\_TGC1(i) \qquad (9)$$

where user_requested_TGC1 is the value of user_requested_TGC at the time when TGC correction unit 304 is actuated, orgImgVal(i:) is a row of original image data in dB that have the same axial location i, newImgVal(i,:) is a row of processed image data in dB that have the same axial location i, and user_requested_TGC is the sum of TGC sliding pot and gain knob values in dB.

Because TGC correction provides uniform image brightness across the entire image, the noise level in the far field may increase. To control the noise in the far field, gain-clamping unit 310 clamps gain when far field noise is detected on the image. More specifically, gain-clamping unit 310 calculates local variance var(i, j) using several subsequent frames, where i and j are the pixel location in the image. For an image, i may be defined from 1 to nsamples, where nsamples is the number of samples along axial direction in the image. Similarly j may be defined from 1 to nvectors.

If for any sample line nval, the average variance is greater than a noise threshold, that is, aveVar(i=nval)>varNoise, then noise is determined to be detected at axial pixel location of nval. Because noise increases with depth, and the strength of the echo signal decreases with depth due to attenuation, once the noise is detected, local gain is reduced gradually such that the transition between a high Signal to Noise Ratio (SNR) region to a low SNR region is smooth.

Figure 6:
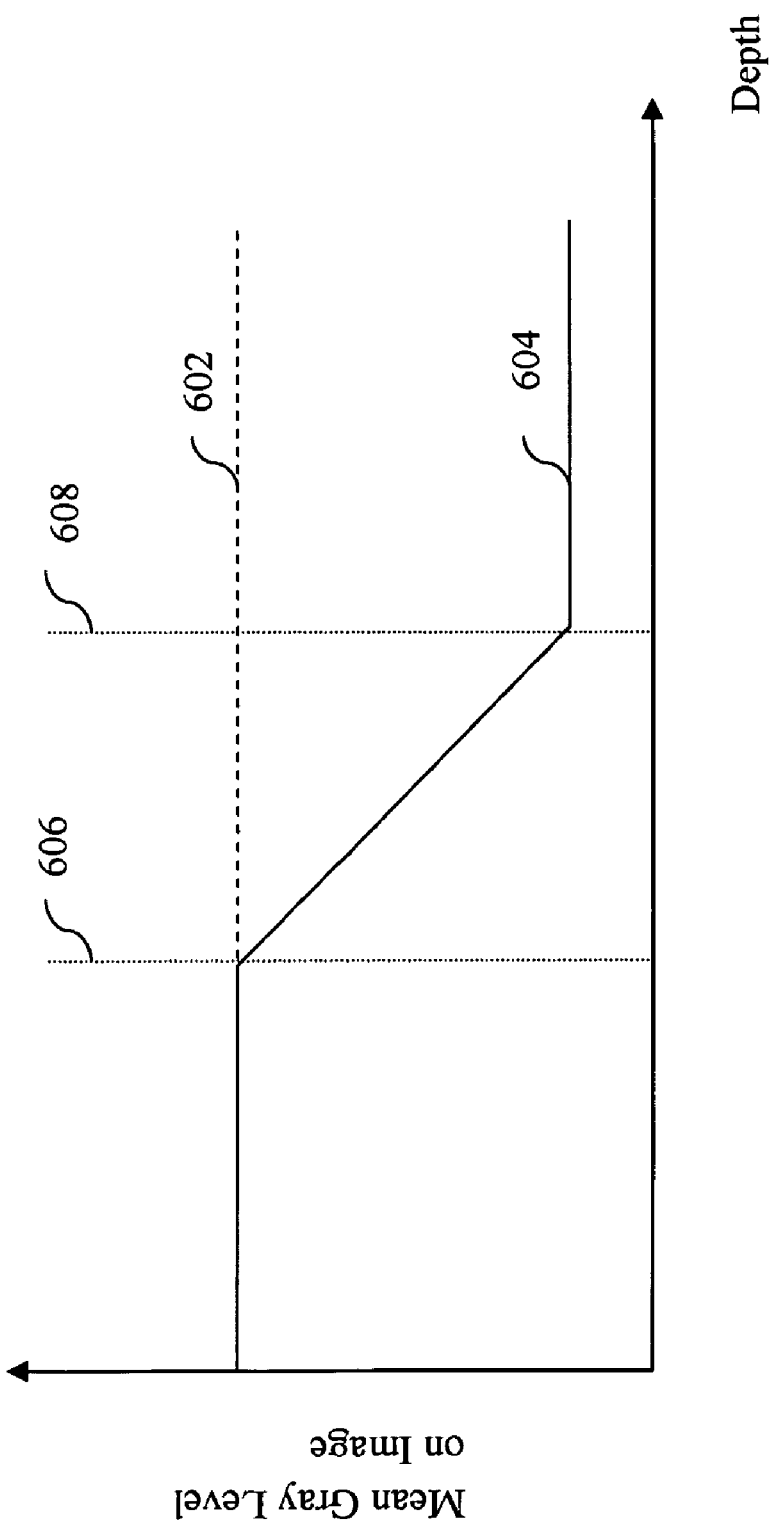
FIG. 6 is a plot illustrating the mean gray level of an image signal before and after processing by a gain-clamping unit in accordance with an exemplary embodiment of the invention.

FIG. 6 is a plot illustrating the mean gray level of an image signal before and after processing by gain-clamping unit 310 (shown in FIG. 3). The plot is of the mean gray level on an image versus the depth of the scan. An unclamped mean gray level 602 presents the image signal before application of gain-clamping by gain-clamping unit 310, and a clamped mean gray level 604 represents the image signal obtained after application of gain-clamping by gain-clamping unit 310. Unclamped mean gray level 602 is uniformly higher over the entire depth range of the scan, indicating no clamping. The plot also shows a depth 606 at which noise is detected. Gain-clamping unit 310 attenuates the image signal after depth 606. The attenuation increases linearly till a depth 608. Beyond depth 608, the image signal is attenuated uniformly. Such clamping provides that the transition between the high SNR region and the low SNR region is smooth, thus resulting in a smooth image for display.

In various embodiments of the invention, only the portion of the image that is most subject to noise is examined for noise detection. For example, the image may be processed from bottom up as the noise is predominantly present in the far field. In another embodiment, the noise detection is performed on every few vectors (e.g., every three vectors) instead of every vector.

Figure 7:
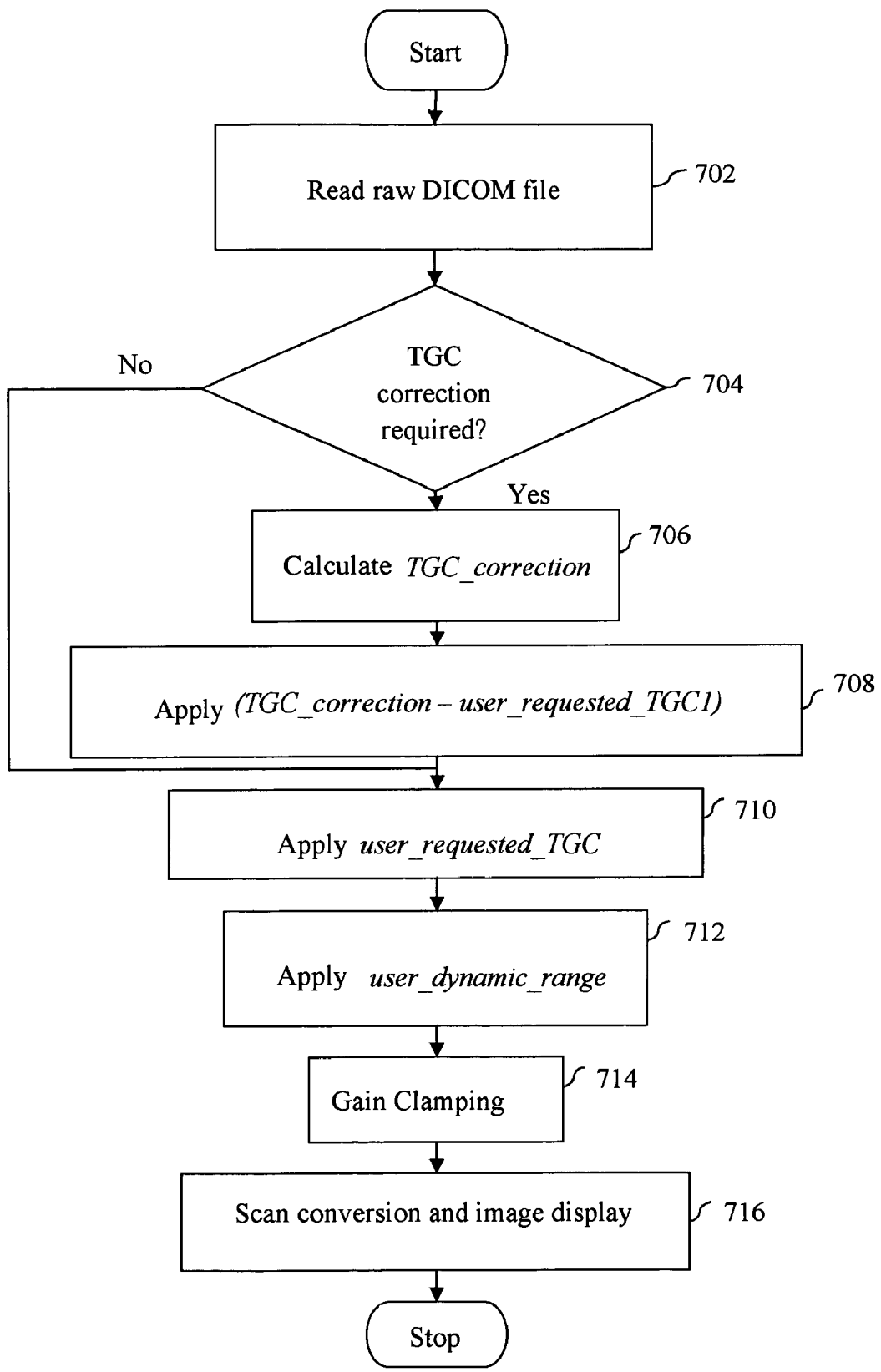
FIG. 7 is a flowchart illustrating a cine loop functionality in accordance with an exemplary embodiment of the invention.

FIG. 7 is a flowchart illustrating a cine loop functionality in accordance with an exemplary embodiment of the invention. At 702, a raw DICOM file is accessed to obtain the raw image data stored in storage unit 312. Then at 704, a determination is made as to whether TGC correction is required for the raw image data based on user input (e.g. push a designated button). If at 704 it is determined that TGC correction is required, then a TGC correction curve is calculated at 706. The method of calculating this curve has been described with reference to FIG. 5. Thereafter, at 708, the image data is time gain compensated by applying (TGC_correction–user_requested_TGC1), where user_requested_TGC1 is equal to user_requested_TGC at the time when TGC correction unit 304 is activated. If a user does not change the user input parameters after activation of TGC correction unit 304 (e.g., make no changes to gain knob value and TGC sliding pots positions), user_requested_TGC is equal to user_requested_TGC1. The application of the external TGC to the image data at the output of TGC correction unit 304 results in uniform tissue brightness in the entire image at the output of external TGC unit 306. If a user modifies user_requested_TGC after activation of TGC correction unit 304, the image at the output of external TGC unit 306 reflects user's preference for the appearance of the image. If TGC correction unit 304 is not activated either by the user or by the system controller of the ultrasound system, then TGC_correction is equal to zero. No TGC correction is applied to the image data by TGC correction unit 304. The user_requested_TGC is applied to the image data by external TGC unit 306.

Thereafter at 710, user_requested_TGC is applied to the image data. This is followed by application of user_dynamic_range at 712. At 714, gain clamping is performed as described with reference to FIG. 6. Finally, at 716, scan conversion is performed and the image is displayed.

In various embodiments of the invention, user_Requested_TGC and user_dynamic_range are user input parameters obtained from data saved in a raw data DICOM file. In an exemplary embodiment of the invention, these parameters are obtained from the ultrasound system that performs raw data playback. The user input parameters can be obtained either by manual adjustment of the gain knob, TGC sliding pots and dynamic range by the user, or by automatic adjustment of these parameters performed by the system in response to the pushing of a button or other means. For example, if an image is saved with the following user input values: gain knob value of 30 dB, TGC sliding pots value of zero dB and dynamic range of 63 dB, during the cine loop playback, a user can play back the image with a new set of user input values as follows: gain knob of 35 dB, TGC sliding pots value of zero and dynamic range of 72 dB. Such changes in the user input values may help to visualize certain anatomy or pathology. This functionality provides for, for example, both physicians and sonographers to fine tune image quality to aid in diagnosis after the image has been acquired or saved.

Figure 8:
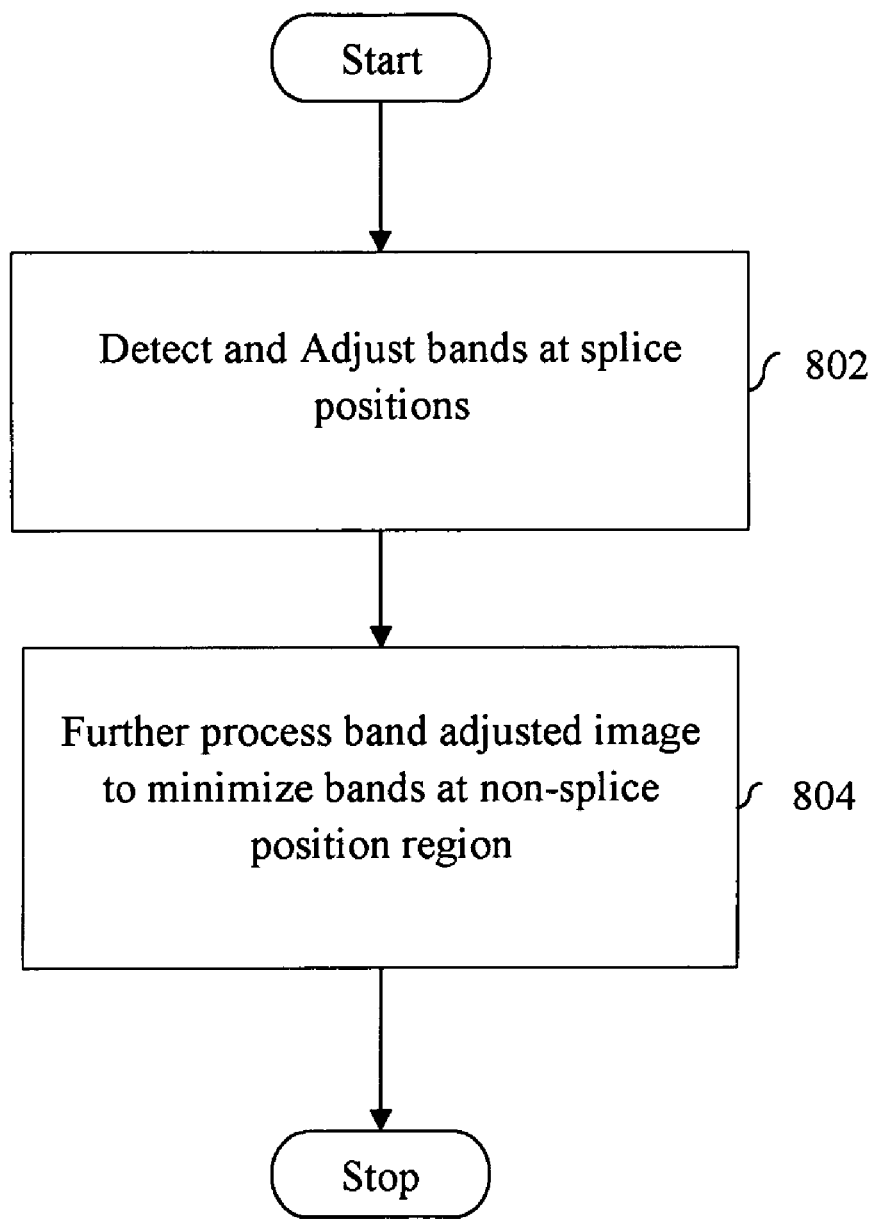
FIG. 8 is a flow chart illustrating a method to prevent banding artifacts in accordance with an exemplary embodiment of the invention.

FIG. 8 is a flow chart depicting a method to prevent banding artifacts in accordance with exemplary embodiment. At 802, banding artifacts at splice positions are detected and adjusted. Various image processing methods may be used to detect the banding artifacts at the splice positions. One such method is described with reference to FIG. 9. Further, a method of adjusting banding artifacts at splice positions is described with reference to FIG. 10. At 804, the image data obtained at 802 is divided into at least one cell to perform automated TGC on the complete image. Each cell of the image is processed independently to obtain a TGC correction curve.

Figure 9:
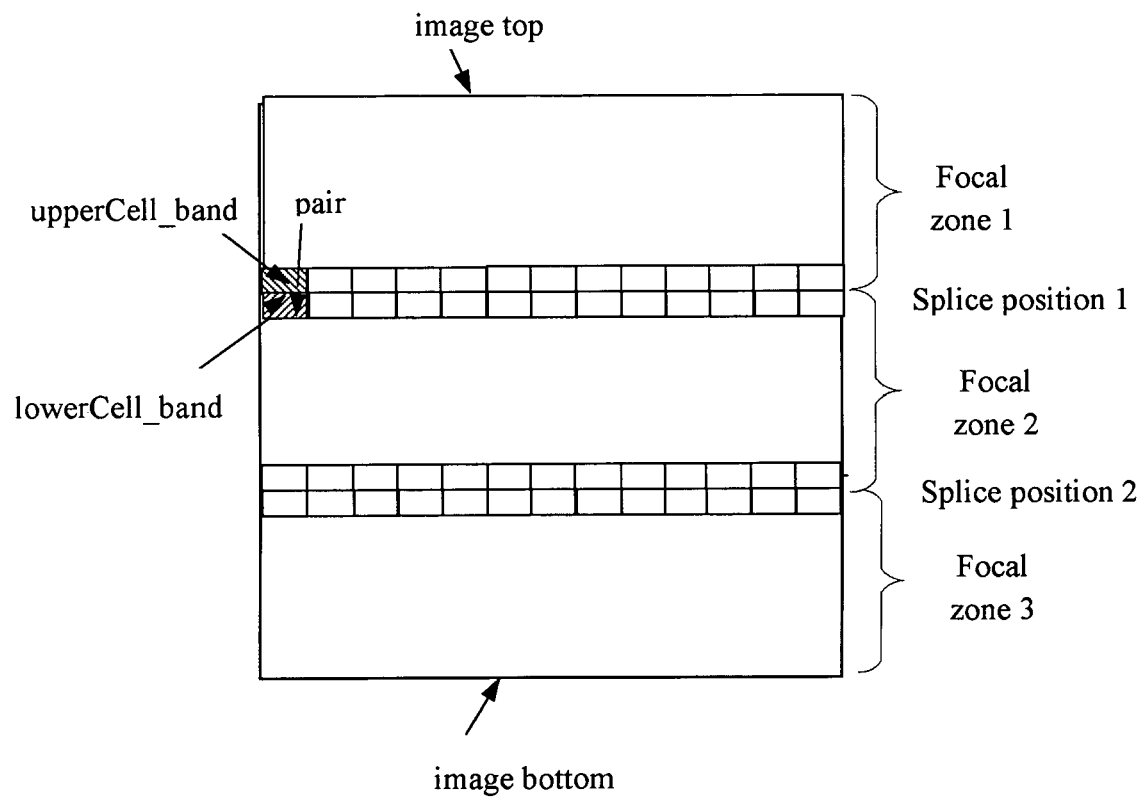
FIG. 9 is a diagram illustrating an exemplary division of image data into a plurality of cells to detect banding artifact at splice positions in accordance with an exemplary embodiment of the invention.

FIG. 9 illustrates an exemplary division of the image data into a plurality of cells in order to detect the presence of banding artifacts at splice positions. The figure shows the image data near splice positions divided into multiple pairs of upper and lower cells. The image data associated with each pixel within the cell is compared with threshold values tissUpp_band and tissLower_band and the cellVal_band is calculated using the following equations:

$$tissUpp\_band = min(imgMean + kupp\_bnd*imgStd, Xupp) \quad (10)$$

$$tissLow\_band = max(imgMean + klow\_bnd*imgStd, Xlow) \quad (11)$$

$$cellVal\_band = median(tissLow\_band < cellData < tissUpp\_band) \quad (12)$$

where kupp_bnd and klow_bnd are empirical integer constants, with typical values of 2 and 3.

If the number of pixels in a cell satisfies Equation 7, the cell is classified as tissue cell. If both cells in a pair of adjacent upper and lower cells are tissue cells, the difference between two, cellVal_band, is calculated and averaged over other qualified tissue pairs to obtain valDelta using the following equation:

$$valDelta = mean(uppCell\_band(i) - lowerCell\_band(i)) \quad (13)$$

where i is the index for the tissue cell pairs.

If valDelta is not equal to zeros, a banding artifact is detected at the splice position. Thereafter, a compensation curve is applied to the image data as described with reference to FIG. 10.

Figure 10:
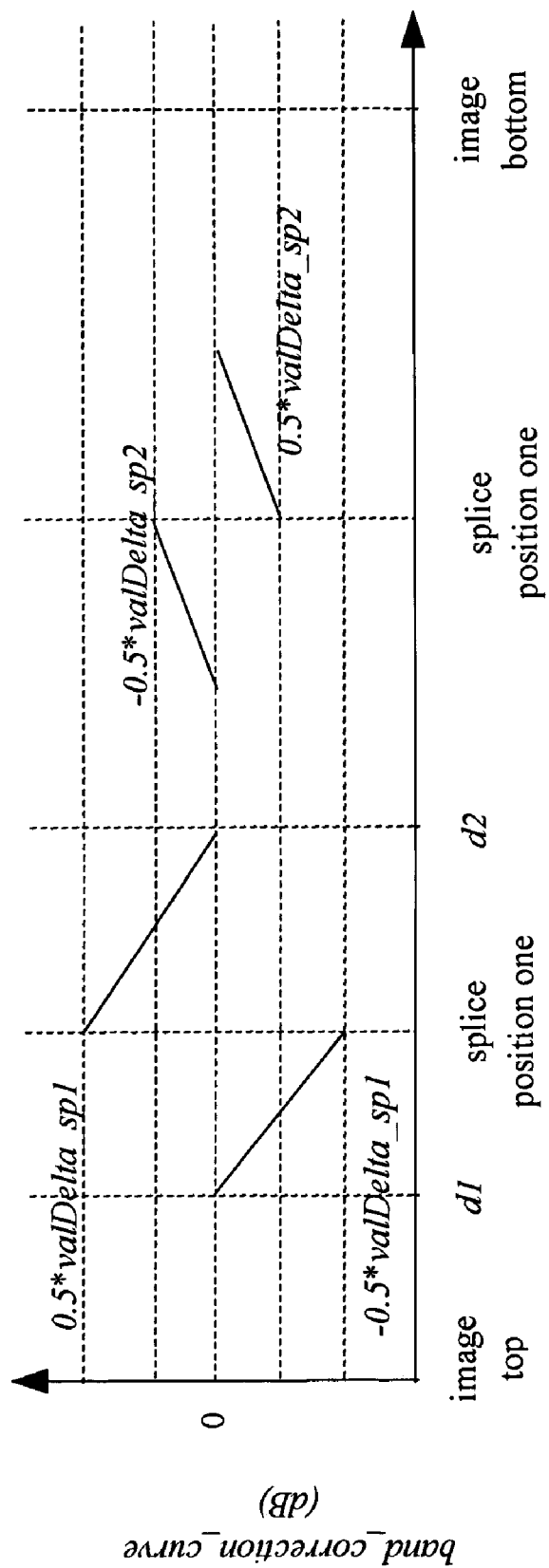
FIG. 10 is a graph illustrating adjustment of banding artifacts at splice positions in accordance with an exemplary embodiment of the invention.

FIG. 10 is a graph illustrating adjustment of banding artifacts at splice positions in accordance with an exemplary embodiment of the invention. The graph shows the plot of a band_correction_curve against depth of the ultrasound image. A value of band_correction_curve greater than zero represents amplification of the image data, while a value of band_correction_curve less than zero represents the attenuation of the image data. The figure shows an image with two splice positions, a splice position one and a splice position two. At splice position one, valDelta is obtained using Equation 13 as valDelta_sp1, wherein valDelta_sp1 is greater than zero. Thus, a depth d1 and a depth d2 are calculated using the following equations:

$$d1 = k1*spliceposition1 \quad (14)$$

$$d2 = splicePosition1 + k2*(splicePosition2 - splicePosition1) \quad (15)$$

where k1, k2 are constants equal to or less than 0.5. The calculation of d1, d2 is applied to all other splice positions where band correction at splice position is needed. Thereafter, band_correction_value for the image are obtained by linearly interpolating attenuation from a value of zero at d1 to −0.5*valDelta_sp1 at splice position one. Further, the gain of the image data to the right of splice position one in the graph is interpolated from a value of 0.5*valDelta_sp1 at splice position one to zero at d2.

A similar procedure is repeated for splice position two. However, as valDelta_sp2 is less than zero, the image to the left of splice position two experiences gain, while that to the right of splice position two experiences attenuation.

In various exemplary embodiments of the invention, one or more processors may be implemented as part of computers within ultrasound system 300. The computers may include a computing machine, an input device, a display unit and an interface, for example, for accessing the Internet. The computers may include a microprocessor. The microprocessor may be connected to a communication bus. The computer may also include a memory. The memory may include Random Access Memory (RAM) and Read Only Memory (ROM). The computers further may include a storage device, which may be a hard disk drive or a removable storage drive such as a floppy disk drive, optical disk drive, and the like. The storage device can also be other similar means for loading computer programs or other instructions into the computer system.

The computers execute a set of instructions to perform the processing as described herein. The computers execute a set of instructions that are stored in one or more storage elements, in order to process input data as described herein. The storage elements also may store data or other information as desired or needed. The storage element may be in the form of an information source or a physical memory element within a processing machine.

The set of instructions may include various commands that instruct the processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine as described herein.

Various embodiments of the invention reduce the problem of banding artifacts in two dimensional, three dimensional and four dimensional ultrasound images. The probe used in the ultrasound system can be either one dimensional probe (wherein transducer elements are arranged in an array fashion) or two dimensional probes (wherein transducer elements are arranged in a matrix fashion) or one dimensional probe with a mechanical positioning device installed. Further, various embodiments of the invention provide a method and system for application of user input parameters for an ultrasound scan after the scan has been performed and stored. Further, various embodiments of the invention provide a method and system for gain clamping to suppress noise in the far field.

A technical effect of the herein described methods and system provide for adjusting user input parameters for a scan after the scan has been performed and stored by applying an external TGC curve and an internal TGC curve on the image data separately. Another technical effect of the herein described methods and system is to provide reduction of banding in ultrasound images with one or more focal zones. For a single focal zone case, this is achieved by dividing the image into multiple cells. For multiple focal zone cases, this is achieved by 1) detecting and correcting bands at a splice position, and/or 2) processing the image by dividing the image into multiple cells of different heights such that the height of cells closer to splice positions are smaller. Another technical effect of the herein described methods and system is to provide suppression of noise in the far field. This is provided by use of gain-clamping.

While the invention has been described in terms of various specific embodiments, those skilled in the art will recognize that the invention can be practiced with modification within the spirit and scope of the claims.

What is claimed is:

1. A method for controlling an ultrasound system, said method comprising:
    processing image data received from an ultrasound system to obtain a time gain compensation correction curve, wherein the image data is internally time gain compensated;
    storing the internally time gain compensated image data; and
    processing the internally time gain compensated image data using the time gain compensation correction curve and user input parameters, the user input parameters including at least one of a user defined time gain compensation parameter and a user defined dynamic range parameter, and wherein the stored image data comprises the internally time gain compensated image data before the internally time gain compensated image data has been processed with the user input parameters.

2. A method in accordance with claim 1 further comprising performing amplitude detection for the received image data.

3. A method in accordance with claim 1 further comprising storing the user input parameters.

4. A method in accordance with claim 3 further comprising processing the stored image data using user input parameters different from the stored user input parameters.

5. A method in accordance with claim 1 wherein the processing is performed dynamically based upon received inputs.

6. A method in accordance with claim 5 wherein the received inputs comprise at least one of (i) a number of focal zones and (ii) a display depth.

7. A method in accordance with claim 1 further comprising displaying an image without a TGC correction curve applied with an image with TGC correction curve applied on a single display.

8. A method in accordance with claim 1 further comprising performing time gain compensation correction before processing the time gain compensated image data using the user input parameters.

9. A method in accordance with claim 8 wherein performing the time gain compensation correction comprises dividing image data defined by one or more image frames into a plurality of cells corresponding to a number of pixels of image data.

10. A method in accordance with claim 9 wherein a displayed image comprises at least two focal zones and the size of at least two of the cells as defined by the number of pixels is different.

11. A method in accordance with claim 10 wherein the image frame is defined by a plurality of focal zones and the size of the cells decreases closer to a divide between focal zones.

12. A method in accordance with claim 10 further comprising determining the size of the cells based in part on an ultrasound application.

13. A method in accordance with claim 9 further comprising defining an upper tissue limit and a lower tissue limit to determine cells corresponding to image data from tissue and cells corresponding to image data from non-tissue.

14. A method in accordance with claim 13 wherein the determination comprises comparing each pixel to the upper and lower tissue limits to determine image data corresponding to tissue and non-tissue.

15. A method in accordance with claim 14 further comprising classifying a cell as corresponding to one of image data relating to tissue and non-tissue based on a number of pixels exceeding one of the upper and lower tissue limits.

16. A method in accordance with claim 15 further comprising determining a last cell corresponding to image data relating to tissue and providing no additional gain correction to the image data in cells after the determined last cell.

17. A method in accordance with claim 9 further comprising determining a variance from a determined threshold noise level based on a plurality of frames of image data and clamping a gain when the variance is exceeded.

18. A method in accordance with claim 17 wherein the variance is determined for each pixel.

19. A method for controlling an ultrasound system, said method comprising:
    performing internal time gain compensation on image data received from the ultrasound system;
    performing amplitude detection on the image data after performing internal time gain compensation;
    processing at least one frame of the image data after performing amplitude detection to determine a time gain compensation correction curve;
    applying time gain compensation correction on the image data using the time compensation correction curve after performing amplitude detection;
    applying at least one of (i) a user defined time gain compensation parameter and (ii) a user defined dynamic range to the corrected image data after amplitude detection; and
    storing the image data before applying the at least one of (i) the user defined time gain compensation parameter and (ii) the user defined dynamic range.

20. A method in accordance with claim 19 wherein the processing comprises dividing at least one frame of image data into a plurality of cells, at least two of the cells defined by a different number of pixels in the image data when an image frame includes at least two focal zones.

21. A method in accordance with claim 19 further comprising performing noise suppression based on at least one of (i) a variance from a determined threshold noise level based on a plurality of frames of image data and (ii) a determination of a last cell having image data corresponding to tissue.

22. An ultrasound system comprising:
   a probe for performing a scan to acquire image data including echoes; and
   one or more processors configured to:
   process the echoes received by the probe to obtain internally time gain compensated image data;
   perform amplitude detection on the internally time gain compensated image data;
   process the internally time gain compensated image data after amplitude detection to obtain a time gain compensation correction curve;
   apply the time gain compensation correction curve to the received image data after amplitude detection; and
   after amplitude detection, perform time gain compensation using user input parameters on the image data that has had the time gain compensation curve applied thereto, the user input parameters including at least one of a user defined time gain compensation parameter and a user defined dynamic range parameter.

23. An ultrasound system in accordance with claim 22 further comprising a memory for storing the internally time gain compensated image data before performing time gain compensation using the user input parameters, and for storing the user input parameters.

* * * * *

UNITED STATES PATENT AND TRADEMARK OFFICE
CERTIFICATE OF CORRECTION

PATENT NO. : 7,604,594 B2 Page 1 of 1
APPLICATION NO. : 10/911014
DATED : October 20, 2009
INVENTOR(S) : Adams et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1465 days.

Signed and Sealed this

Fifth Day of October, 2010

David J. Kappos
*Director of the United States Patent and Trademark Office*